Dec. 17, 1940.    A. G. SCHNEIDER ET AL    2,224,884
PLANETARY TURBINE TRANSMISSION
Filed Aug. 7, 1936    4 Sheets-Sheet 1

Dec. 17, 1940.  A. G. SCHNEIDER ET AL  2,224,884
PLANETARY TURBINE TRANSMISSION
Filed Aug. 7, 1936  4 Sheets-Sheet 4

Patented Dec. 17, 1940

2,224,884

UNITED STATES PATENT OFFICE 2,224,884

PLANETARY TURBINE TRANSMISSION

Adolf G. Schneider, Muncie, Ind., and Heinrich Schneider, Auburn, N. Y., assignors to Schneider Brothers Corporation, Wilmington, Del., a corporation of Delaware Application August 7, 1936, Serial No. 94,744

19 Claims. (Cl. 74—189.5)

This invention relates to hydraulic transmissions of the Föttinger turbine type, more particularly a differential transmission of that type, and constitutes an improvement upon the co-pending application of Heinrich Schneider Serial No. 755,094, filed November 28, 1934.

In differential transmissions like the one disclosed in the copending application just mentioned, a primary and a secondary drive cooperate to transmit the total power from the driving shaft to the driven shaft, and the amount of power transmitted by each of the drives may vary from zero to full power, or vice versa, the sum of the two being always equal to the full power transmitted. In said application, a hydraulic torque converter formed the secondary drive and was combined with planetary gears forming the primary drive. In that case, the torque converter consisting of a pump impeller driven from the primary drive, a turbine wheel mounted on the driven shaft, and a substantially stationary reaction member, had guide blades on the reaction member specially formed so as to cause the turbine to turn in the opposite direction from the impeller to meet the requirements of the combination. It is the principal object of our invention to provide a similar transmission of a more compact and simplified construction wherein the primary drive is formed preferably by a planetary gear set having dual planetary pinions so as to turn the pump impeller of the secondary drive in the same direction as the driving shaft and accordingly obviate the necessity for a reversal in the direction of fluid flow by the reaction member, the turbine wheel being turned in the same direction with impeller with a consequent increased efficiently of operation as well as numerous other advantages later explained.

Other objects of our invention, as hereinafter fully pointed out, deal with other improvements is the transmission designed to further increase the efficiency of operation, namely:

(a) The provision of an inertia flywheel preferably on the high speed member of the secondary drive, that is, on the sun gear rotor, to obtain better starting performance;

(b) The provision of a centrifugal clutch between the driving shaft and the ring gear, or between the ring gear and the engine flywheel, to eliminate drag when the engine is idling;

(c) The provision of a freewheeling clutch between the ring gear and the driving shaft, or between the ring gear and the flywheel of the engine, to permit use of the engine as a brake in going down hill, and also permit starting the engine by pushing or pulling the vehicle;

(d) The provision of means for releasably locking the planetary gearing for positive direct drive;

(e) The provision of novel means for filling the torque converter in a predetermined relation to the starting of the engine for best efficiency as well as novel means for automatically draining the oil from said converter when the engine idles, and further means for preventing drainage during direct drive, and (f) The provision of improved means for applying braking action to the impeller of the torque converter in timed relation to the release of the coupling pawls that lock the planetary gear set in direct drive, whereby the vehicle is caused to drive the engine through the planetary gearing for brake effect while at the same time the turbine impeller turning with the drive shaft relative to the stationary pump impeller secures a still further very effective braking action.

The invention is hereinafter described by reference to the accompanying drawings, in which—

Similar reference numerals are applied to corresponding parts throughout the views.

Figures 1, 1A, 1B:
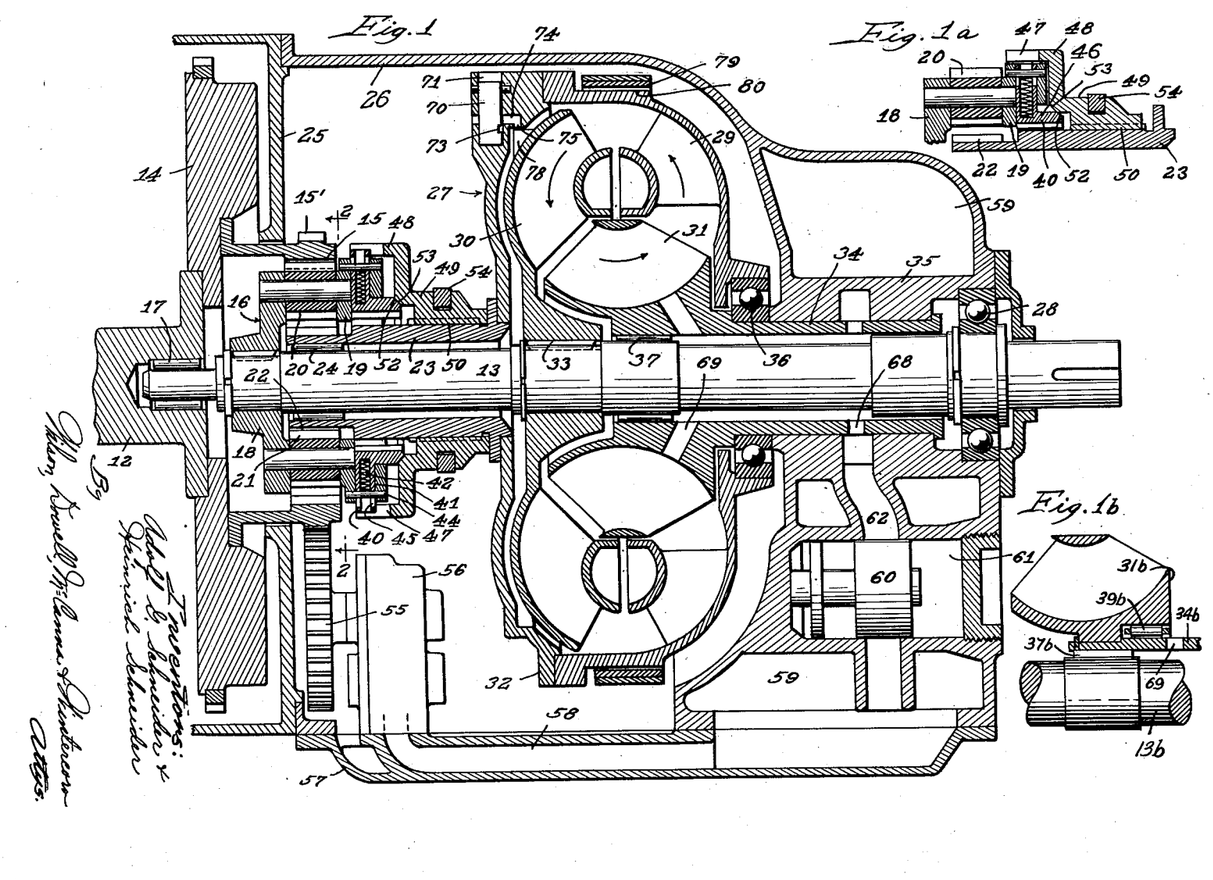
Figure 1 is a central longitudinal section through a transmission made in accordance with our invention.
Fig. 1a is a sectional detail of a portion of Fig. 1, showing parts in moved positions.
Fig. 1b is a sectional detail corresponding to a portion of Fig. 1, showing a slight variation in construction.
Figure 2:
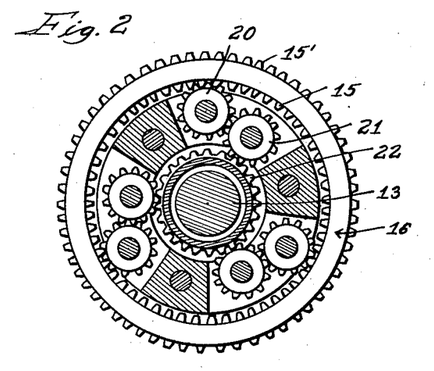
Fig. 2 is a section approximately on the line 2—2 of Fig. 1, showing the preferred planetary gearing.
Figure 8:
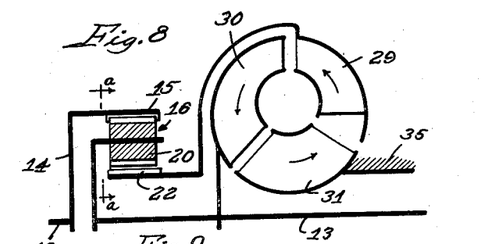
Fig. 8 is a diagram of the transmissions shown in Figs. 1 and 7, showing only so much as occurs on one side of the center line.
Figure 8A:
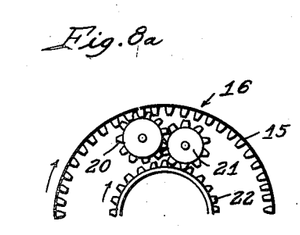
Fig. 8a is another diagrammatic view of the dual planetary gearing taken on the line a—a of Fig. 8.

Referring first to Figs. 8 and 8a and related Fig. 1, the driving and driven shafts are numbered 12 and 13, respectively. The shaft 12 in Fig. 1 is the crankshaft of an internal combustion engine, the transmission there illustrated being one suitable for use in an automobile. 14 is a flywheel on the shaft 12 carrying a ring gear 15 of a dual planetary transmission, indicated generally by the numeral 16. A pilot bearing 17 is provided in the end of shaft 12 for the front end of the driven shaft 13. A spider 18 on shaft 13 and a ring 19 surrounding the shaft provide supports for the intermeshed pairs of dual planetary pinions 20—21, of which the pinions 20 mesh with the ring gear 15, and the pinions 21 mesh with the sun gear 22. The latter is provided on the front end of a sleeve 23 that surrounds the shaft 13 and is supported thereon suitably on a needle bearing 24. The flywheel 14 is in a housing 25 and the planetary gearing 16 is in another housing 26 behind the first housing. The housing 26 also contains the hydraulic torque converter, indicated generally by the numeral 27. The driven shaft 13 extends rearwardly through the torque converter and out of housing 26 and is supported in a ball bearing 28 provided in the rear end of the housing. The torque converter 27 comprises a pump impeller 29, a turbine wheel 30 and a reaction member 31. The impeller 29 is secured to a plate 32 carried on the rear end of the sleeve 23 so that it turns with the sun gear 22. The turbine 30 is keyed to the driven shaft 13, as at 33, so as to transmit drive thereto. The reaction member 31 is stationary and is supported by its tubular extension 34 in the valve chest 35 provided in the rear end of the housing 26. A ball bearing 36 surrounding the front end of the tubular extension 34 forms a support for the rear end of the impeller 29, and a needle bearing 37 within the reaction member 31 provides an intermediate supporting bearing for the driven shaft 13.

In operation, it will be assumed to begin with that the driven shaft 13 which may be connected with the propeller shaft of an automobile or other vehicle is at a standstill and that the driving shaft 12 is, as stated before, either the rotating crank-shaft of an internal combustion engine or else a shaft connected thereto and rotated thereby. Under these circumstances, the sun gear 22 and pump impeller 29 are driven in the same direction as the shaft 12, but at a higher speed in accordance with the gear ratio of ring gear 15 to sun gear 22. The planetary gear set 16 constitutes what we have previously referred to as the primary drive, and the torque converter 27 is the secondary drive. The primary drive exerts a substantially direct torque reaction upon the driven shaft 13 by reason of the thrust imposed upon the planetary pinions 20—21 in the turning of the ring gear 15 and the driving of the sun gear 22. There is an additional torque reaction imposed upon the driven shaft 13 by the turbine wheel 30 of the secondary drive, because of the circulation of fluid by the blades of the pump impeller 29 through the blades of the turbine 30 and blades of the reaction member 31 in the counterclockwise direction indicated by the arrows. The fact that the impeller 29 turns in the same direction with the driving and driven shafts avoids the necessity for any reversal in the direction of fluid flow by the blades of the reaction member 31, such as was required in the construction of the other application previously mentioned. By driving the impeller with the sun gear at speeds higher than the prime mover speed and in the same direction as the turbine impeller, we are enabled to reduce the size of the whole turbine drive considerably and still obtain a decided increase in torque and efficiency. The stationary reaction member is, of course, responsible for torque increase. When the impeller 29 turns at a higher speed than the turbine 30, it is due to the difference in the centrifugal force acting on the oil or other fluid used which causes the oil to circulate in the direction indicated by the arrows. When the impeller and turbine rotate at approximately the same speed, the turbine drive operates substantially as a coupling and the stationary member may, if so desired, have a freewheeling clutch as illustrated in Fig. 1b, wherein 31b designates the reaction member, 34b the stationary tubular support therefor, 37b the needle bearing, 13b the driven shaft and 39b the freewheeling clutch to permit the reaction member 31b to float so as not to offer resistance to the flow of the fluid, but even without the freewheeling clutch, the flow of the fluid is very small close to direct drive in the differential transmission, and hydraulic losses are therefore negligible. Close to direct drive operation, the gears of the planetary drive rotate as a unit and gear noise and wear are substantially eliminated and high efficiency is therefore obtained in the gear set also. At high torque operation, the pump impeller turning with the high speed of the sun gear delivers a large amount of fluid directly upon the turbine blades exerting the desired high torque on the driven shaft, and this torque is added to the reaction torque exerted by the planetary gear set. The turbine torque is a maximum when the driven shaft 13 is at a standstill. If the speed of the engine is increased, the total torque imposed upon the driven shaft increases until it overcomes its resistance and the shaft begins to turn. As soon as the resistance of the driven shaft is reduced its speed increases and and the speed of the sun gear 22 is accordingly reduced, assuming that the driving shaft is turning at a constant speed. Under these circumstances the pump impeller 29 reduces its oil delivery and pressure and hence the torque exerted on the driven shaft 13 by the turbine wheel 30 is reduced. When the resistance to turning of the driven shaft is reduced to a minimum, its speed approaches a maximum and the speed of the sun gear 22 and pump impeller 29 approaches a minimum, and consequently the power transmitted to the driven shaft through the secondary drive becomes a minimum. In other words, with the present transmission, the torque and speed of the secondary drive changes automatically in response to the resistance to turning offered by the driven shaft 13. The secondary drive gives a torque increase varying with the varying torque and speed conditions of the engine and load. The capacity of the hydraulic secondary drive 27 will be predetermined in relation to the gear ratio of the planetary drive 16, so that the efficiency of the secondary drive is highest over the speed and torque range most used in the particular application. The "floating" sun gear and pump impeller act as an automatic torque and speed control in the transmission, running at high speed when the driven shaft requires high torque. In an ordinary hydralic coupling drive where the internal combustion engine drives the primary shaft of the coupling, the maximum speed of the engine is limited by the torque of the driven shaft and the engine cannot be speeded up to develop full power when the vehicle is at a standstill or during the acceleration period. With our construction, on the other hand, the engine can be speeded up even when the driven shaft is stationary, because the floating rotor formed by the sun gear and impeller gives way and rotates at high speed to transmit the engine power to the secondary drive where it is converted into torque applied to the driven shaft. The higher the speed of the engine under this stationary shaft condition, the higher the speed and transmitted power of the floating rotor. Therefore, by suitably proportioning the impeller, the reaction of the floating rotor to changes in the speed of the engine can be made of greater or less value, and by further suitable relative proportioning of the impeller and turbine wheel, the maximum torque exerted on the driven shaft for a given engine torque can be varied as desired, or the high efficiency range of the transmission shifted toward the desired speed and torque range of the specific application for which the transmission is to be used. An important advantage of this combination is that all slippage incident to the operation occurs in the hydraulic torque converter, so that the only friction is between relatively moving fluid instead of relatively moving surfaces of mechanical parts that would accordingly be subject to wear. Incidentally, an important thing to consider in that connection is that the operation of the present transmission gives torque increase during the slippage, whereas with other transmissions involving mechanical clutching engagement, there is an actual loss of power coincident with the wearing away of the engaging surfaces, the lost power being converted into useless heat of friction.

Figure 9:
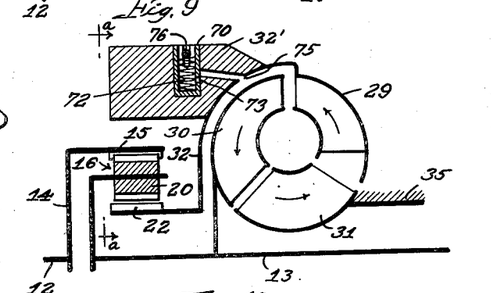
Figs. 9 and 10 are diagrammatic views similar to Fig. 8, illustrating in Fig. 9 the inertia flywheel feature and in Fig. 10 the centrifugal clutch feature previously mentioned.
Figure 9A:
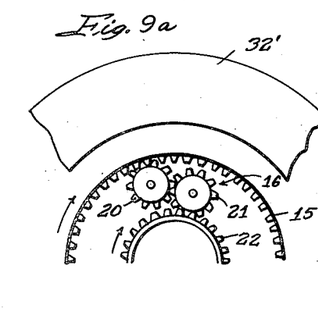
Fig. 9a is a diagrammatic view on the line a—a of Fig. 9.

Now, referring to Figs. 9 and 9a in connection with Fig. 1, the numeral 32' in Figs. 9 and 9a indicates the inertia flywheel represented by the extra mass of the plate 32 added to the mass of the impeller 29. This flywheel may be provided anywhere in the transmission between the driving and driven shafts, but preferably on a high speed member, and we have found it most advantageous to provide it on the floating rotor formed by the sun gear 22 and impeller 29. With this flywheel, the starting torque can be increased several times over what would otherwise be possible, remembering that in a turbine drive, particularly in a coupling turbine drive, it is impossible to speed up the prime mover like a Diesel engine to full speed while the driven shaft is standing still, and in most designs there is only about half or one-third of full speed obtainable while starting, and consequently only part of the engine's power is available in the starting period. Our transmission is operated with the turbine drive 27 emptied before starting, thus allowing the engine to be driven up to full speed, speeding up the sun gear with its flywheel while the driven shaft 13 is at a standstill. In the case of a Diesel engine serving as the prime mover in a train, for example, the Diesel engine is under governor control and will keep the engine idling after the speeding up, and to start the train the turbine drive 27 will be filled with oil or other fluid, so that the impeller 29 will discharge fluid upon the turbine 30 and thus exert high torque on the driven shaft. The pumping action of the inertia rotor pump impeller tends to slow down its speed, but the engine under governor control has its throttle opened to maintain speed and develop full power required in starting. During the starting period, the inertia flywheel speed decreases, and its momentum is spent in accelerating the train. Without this flywheel, there would be only half the engine's power available, but with it there is full power available and, according to the size of the flywheel, during the first part of the starting period one may derive one or two times the power of the engine from this flywheel alone, and thus secure a total of several times the usual starting torque and power. It is apparent that with this flywheel feature the starting performance can be varied within wide limits, as desired.

Figure 10:
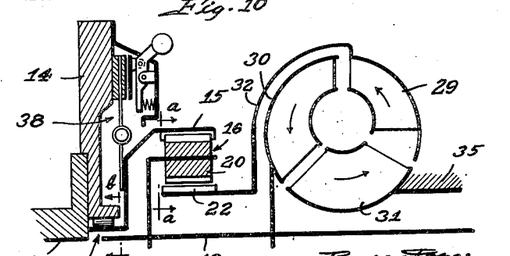
Figure 10A:
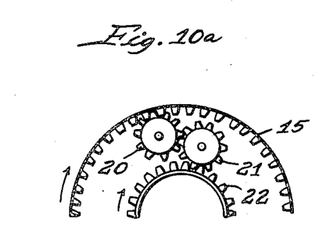
Figs. 10a and 10b are diagrammatic views on the lines a—a and b—b of Fig. 10.
Figure 10B:
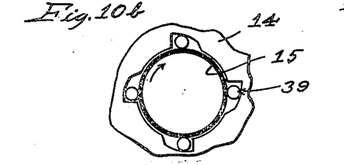

Referring now to Figs. 10-10b in connection with Fig. 1, it will be seen that a centrifugal clutch may be provided between the ring gear 15 and the driving shaft 12, in this case between the ring gear 15 and the flywheel 14, to eliminate the drag otherwise effective upon the engine in idling. By providing a centrifugal clutch like that indicated generally by the numeral 38 in Fig. 10, ahead of the planetary gear set 16, the engine is always disconnected when idling, and any shift in forward or reverse can be made easily and smoothly. When the vehicle is started, this clutch merely starts the sun gear 22 and impeller 29, and inasmuch as the pump impeller develops only a part of the torque at slower speeds of the engine, this clutch 38 could be smaller than the usual clutch employed in connection with an ordinary change-speed gearing. In addition, we contemplate providing a freewheeling clutch 39 between the ring gear 15 and the driving shaft 12, that is, between the ring gear 15 and the flywheel 14 in this case. This freewheeling clutch overruns whenever the engine is turning faster than the ring gear 15, but when the driven shaft 13 commences to turn faster than the engine, as, for example, when the vehicle is going down hill, the clutch 39 engages and thus permits using the engine as a brake. This clutch 39 is also useful in starting the engine by pushing or pulling the vehicle. Neither of the clutches 38 and 39 happens to be illustrated in Fig. 1, but it should be understood that they may be provided as a part of that construction.

Figure 3:
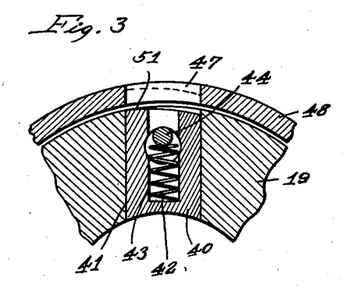
Fig. 3 is an enlarged sectional detail of one of the coupling pawls in the position illustrated in Fig. 1a, but indicating in dotted lines the position illustrated in Fig. 1.

Referring now to Figs. 1 and 1a and 3, locking dogs or pawls 40 are slidable in radial bores 41 in the ring 19 forming a part of the planetary gear cage. These pawls are normally urged inwardly under the action of springs 42 supported in the bores 43 in the pawls and bearing against crosspins 44 entered through longitudinal slots 45 provided in the pawls. The pawls are weighted at their inner ends, as at 46, and are arranged to move outwardly under centrifugal force against the action of the springs 42 to engage in slots 47 provided therefor in the annular flange 48 of a coupling collar 49 splined on the extension 23 of the sun gear 22, as indicated at 50. Obviously, when the pawls 40 are engaged in the slots 47, as appears in Fig. 1, the planetary gear set 16 is locked and the shaft 13 turns at the same speed as the engine. In other words, there is positive direct drive because the sun gear 22 is positively locked to turn with the ring gear 15 at the same speed, and there can be no relative movement between the impeller 29 and turbine 30. Now, these pawls are centrifugally operated and will tend to slide out at a certain speed of the driven shaft 13. The outer ends 51 of these pawls are, as shown in Fig. 3, struck on arcs not coincident with the axis of rotation of the ring 19 and coupling collar 49, so that they can engage in the slots 47 only when the coupling collar 49 rotates slower than the driven shaft 13. If the reverse is true, namely, when the flange 48 is turning faster than the ring 19, the pawls 40 will, by reason of the cam surfaces 51, be pushed inwardly by the flange, and locking engagement between the parts is impossible. The pawls, it will also be noticed, have inclined surfaces 52 formed on their inner ends arranged to be engaged by the inclined annular cam surface 53 on the inside of the coupling collar 49, as in Fig. 1. Now, the collar 49 can be shifted to and fro by means of a manually operated yoke 54, and when the collar is moved forward to the position shown in Fig. 1a, the pawls 40 are forcibly retracted from engagement in the slots 47, to disconnect direct drive. In other words, with the present construction, we can obtain positive direct drive at will, and can also disconnect this direct drive when desired, and the mechanism employed for accomplishing this is relatively simple, compact and inexpensive.

Figure 6:
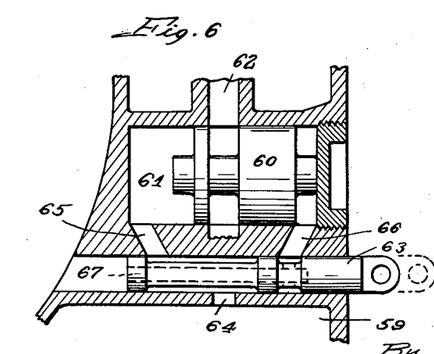
Fig. 6 is a sectional detail of the filling valve shown in Fig. 1 and its cooperating control valve.

The turbine drive 27, as we shall now describe, can be filled automatically in a predetermined relation to the starting of the engine so as to secure best operating efficiency. It can likewise be drained at idling speed to eliminate drag. Thus there is an outer ring gear 15' on the ring gear 15 meshing with the driving gear 55 of a gear pump 56 disposed in the housing 26 and arranged to pump oil from the bottom of the housing and from the oil pan 57, and discharge the oil through a channel 58 into the oil reservoir 59 formed in the rear part of the housing 26 and pan 57. The pump 56 keeps oil in the reservoir 59 under a certain pressure, and surplus oil is by-passed into the housing 26 and pan 57 through the usual relief valve, not shown. A piston type filling valve 60 operates in the cylinder 61 to connect or disconnect the turbine drive 27 with the reservoir 59. In Fig. 1, the valve is shown closed, but in Fig. 6 it is shown in open position allowing oil to be introduced through the passage 62 from the reservoir 59. A plunger type control valve 63 controls the filling valve 60, and, in the position shown in Fig. 6, allows oil from the reservoir 59 to enter the left-hand end of the cylinder 61 through ports 64 and 65 while oil is drained from the right-hand end through the port 66 and through a longitudinal bore 67 in the valve 63. Obviously, if the valve 63 is moved to the dotted line position indicated, oil under pressure is supplied through the port 66 from the reservoir 59 while oil is exhausted from the other end of the cylinder through port 65 back into the housing 26, thus causing the valve 60 to move back to the position shown in Fig. 1. The control valve 63 is arranged to be operated manually to the position shown in Fig. 6 with the first movement of the accelerator pedal of the engine. When the accelerator pedal is released, the control valve 63 moves to the dotted line position shown in Fig. 6, and the valve 60 accordingly closes to shut off the turbine drive 27 from the reservoir 59. When the valve 60 opens, oil rushes through the passage 62 and through the ports 68 and 69 in the reaction member 31 into the turbine drive. Hence, the filling up of the turbine drive is in a predetermined relation to the starting and speeding up of the engine, and, if desired, there may be a certain lost motion provided in the connection between the accelerator pedal and the valve 63, so that the latter will not be shifted and cause the opening of the valve 60 when the engine is merely idling, but only when the engine is being speeded up to get the vehicle under way.

Figure 4:
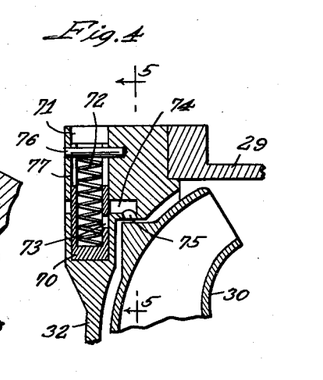
Fig. 4 is an enlarged sectional detail of a portion of Fig. 1, illustrating one of the drain valves and a cooperating stopper on the turbine wheel.

The plate 32 attached to the pump impeller 29 has a number of drain valves 70 provided on the circumference thereof, each of which valves, as illustrated in Fig. 4, consists of a plunger slidable radially in a bore 71 in the plate 32 and arranged to move outwardly under centrifugal force against the action of a spring 72, so as to move a port 73 into communication with a passage 74 that opens into the inside of the turbine ring through port 75. A cross-pin 76 passed through longitudinal slots 77 in the valve body 70 provides an abutment for the outer end of the spring 72, and also serves to limit the outward movement of the valve under centrifugal force. The springs 72 are so calculated that the slots 73 of the drain valves 70 are in line with the passages 74 to permit escape of oil from the turbine drive when the engine is idling. At a standstill, the valves 70 are closed to prevent oil drainage, and beyond idling speed when the accelerator pedal is depressed to speed up the engine and at the same time the pump impeller 29, the valves 70 move outward from a position of register with the passages 74 and oil drainage is stopped, and at the same time the filling valve 60 has been opened and oil is accordingly delivered into the turbine ring. It is seen, therefore, that the valves 70, while they permit drainage of the oil during idling of the engine, serve to prevent oil drainage at normal operating speeds.

Figure 5:
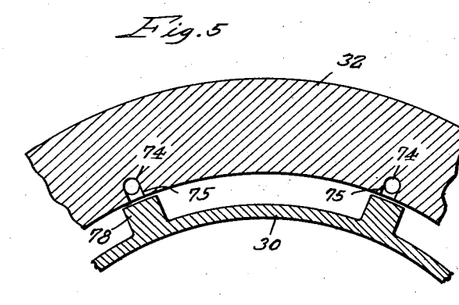
Fig. 5 is a section taken on the line 5—5 of Fig. 4, showing how the plurality of stoppers cooperate with a plurality of drain ports.

The turbine wheel 30, as appears in Fig. 5, has a plurality of stoppers for the ports 75 provided in the form of projections 78 on the back of the turbine wheel in the same circumferentially spaced relation as the ports 75 in the plate 32. These stoppers will serve to close the ports completely under positive direct drive operation of the transmission, namely, when the pawls 40 are engaged in the slots 47 of the coupling collar 49. Hence, in direct drive, there can be no drainage of the turbine ring in the event the accelerator pedal is released, and if the operator should then release the pawls 40 by movement of the coupling collar 49, in order to obtain more performance than in direct drive, the turbine drive 27 will be filled and ready for action.

A brake band 79 suitably mounted in the housing 26 is arranged to engage a flat annular surface 80 on the periphery of the impeller 29, and is arranged to be operated suitably with the left foot pedal. Thus, one may hold the impeller 29 and sun gear 22 stationary by simply depressing the brake pedal, and under these conditions the oil cannot drain out and the vehicle will drive the engine through the planetary gear set 16, and thus obtain a desired braking action. At the same time, the turbine wheel 30 rotating at drive shaft speed discharges oil to the stationary pump impeller blades and thus secures a very effective hydraulic braking action. When braking with the turbine drive 27, the direct drive pawls 40 are always released. If it is desired to start the engine by pushing or pulling the vehicle, the brake band 79 can be applied when the vehicle is in motion, and in that way the engine will be turned over and started.

Figure 7:
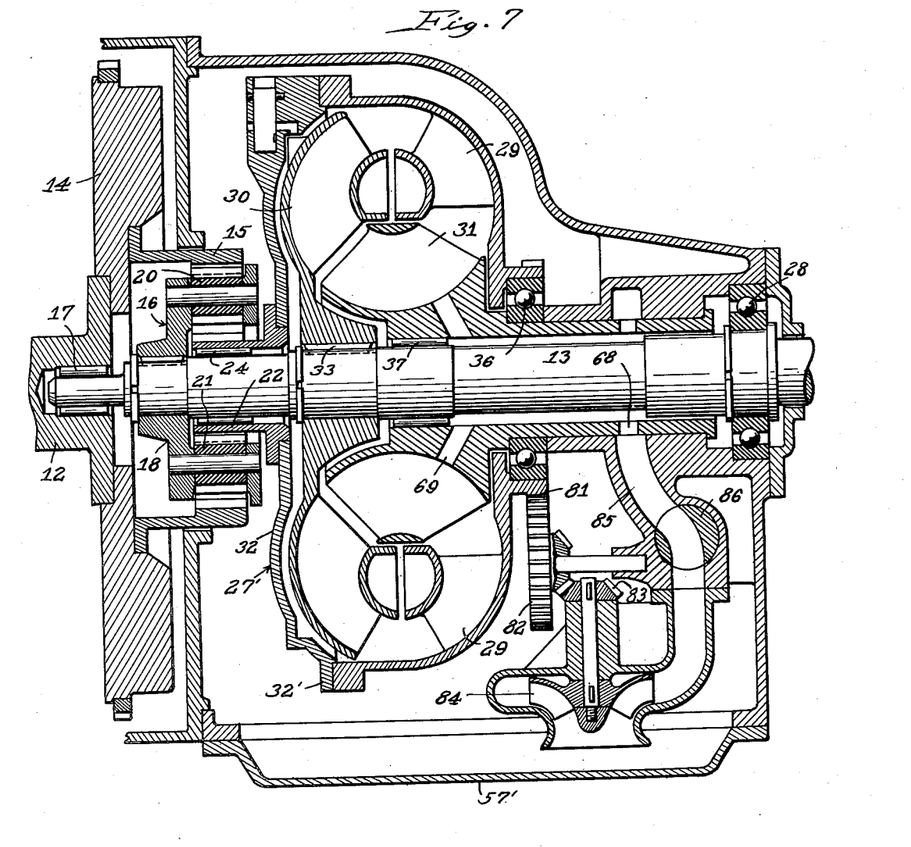
Fig. 7 is a view similar to Fig. 1, showing another transmission in which the principal difference lies in the use of a turbine pump for filling the torque converter and a simpler form of valve control therefor.

In the construction disclosed in Fig. 7, a simpler means is provided for filling the turbine drive shown at 27'. In this case, a gear 81 is provided on the impeller 29 and meshes with a gear cluster 82 including a bevel drive gear 83 of a turbine pump 84. This pump draws oil from the oil pan 57' and delivers it to the turbine ring through the passage 85 when a rotary valve 86 is turned to the position shown. The valve 86 will in this case be controlled similarly as in the previous one by the accelerator pedal. Drain valves similar to the valves 70 will be provided in this case for drainage of oil from the turbine drive.

Figure 11:
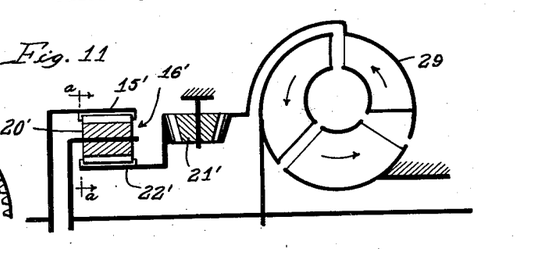
Fig. 11 is a diagrammatic view similar to Fig. 8, but showing the possible use of an ordinary planetary gear set with a bevel planetary set to obtain the same results as the planetary set of the other figures.
Figure 11A:
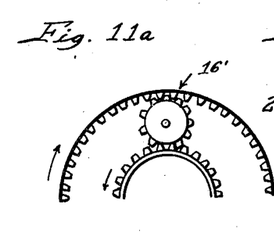
Fig. 11a is a diagrammatic view of the planetary gearing taken on the line a—a of Fig. 11.

In conclusion, attention is called to Figs. 11 and 11a showing another construction for obtaining the advantages of the planetary gear set 16 with an ordinary planetary gear set 16'. Since the sun gear 22' under these conditions turns in the reverse direction relative to the ring gear 15', there being only single planetary pinions 20' therebetween, it is necessary to provide reversing gears 21' between the sun gear 22' and the pump impeller 29. In that way, the impeller 29 is caused to turn in the same direction as the ring gear 15'.

It is believed the foregoing description conveys a good understanding of the objects and advantages of our invention. The appended claims have been drawn with a view to covering all legitimate modifications and adaptations.

We claim:

1. In a differential transmission, the combination of driving and driven elements, a planetary type transmission mechanism having a ring gear arranged to turn with the driving element, a sun gear, and planetary pinions connected to revolve with and transmit torque to the driven element and transmitting drive between the ring gear and sun gear, the sun gear being independent of the driving and driven elements, a centrifugal clutch for automatically connecting the ring gear with the driving element when the latter attains a certain speed, and a turbine ring type torque converter comprising rotatable pump impeller and turbine members and a cooperating stationary reaction member, the turbine member being arranged to transmit torque to the driven element, and the impeller member being driven by the sun gear.

2. In a differential transmission, the combination of driving and driven elements, a planetary type transmission mechanism having a ring gear arranged to turn with the driving element, a sun gear, and planetary pinions connected to revolve with and transmit torque to the driven element and transmitting drive between the ring gear and sun gear, the sun gear being independent of the driving and driven elements, an overrunning clutch between the ring gear and the driving element arranged to engage automatically in the event the ring gear turns faster than the driving element, and a turbine ring type torque converter comprising rotatable pump impeller and turbine members and a cooperating stationary reaction member, the turbine member being arranged to transmit torque to the driven element, and the impeller member being driven by the sun gear.

3. In a differential transmission, the combination of driving and driven elements, a planetary type transmission mechanism having a ring gear arranged to turn with the driving element, a sun gear, and planetary pinions connected to revolve with and transmit torque to the driven element and transmitting drive between the ring gear and sun gear, the sun gear being independent of the driving and driven elements, a centrifugal clutch for automatically connecting the ring gear with the driving element when the latter attains a certain speed, an overrunning clutch between the ring gear and the driving element arranged to engage automatically in the event the ring gear turns faster than the driving element, and a turbine ring type torque converter comprising rotatable pump impeller and turbine members and a cooperating stationary reaction member, the turbine member being arranged to transmit torque to the driven element, and the impeller member being driven by the sun gear.

4. In a mechanical-hydraulic transmission, the combination of driving and driven elements; a planetary transmission comprising a ring gear turning with the driving element, a sun gear, and planetary pinions revolving with the driven element and interposed between the ring gear and sun gear to drive the latter; a torque converter comprising a rotary housing turning with the sun gear, a rotary impeller turning with said housing, a rotary turbine wheel in said housing turning with the driven element, and a stationary reaction member in said housing; a plurality of drain valves in circumferentially spaced relation on the periphery of said housing, each comprising a plunger movable in one direction under centrifugal force relative to a drain port provided in the housing wall, and spring means normally urging said plunger in the opposite direction, said plunger and spring means coacting whereby at a certain speed of rotation of said housing said plunger is in open position but at higher speeds and at lower speeds or at standstill of said housing the plunger prevents drainage of fluid from said housing; stoppers for closing said drain ports provided in circumferentially spaced relation on said turbine wheel, and means for releasably locking said planetary transmission to prevent relative rotation between the ring gear and sun gear and between the turbine wheel and the housing with the turbine wheel turned so as to dispose the stoppers in operative relation to the drain ports.

5. In a mechanical-hydraulic transmission, the combination with driving and driven elements, of a torque converter comprising a rotary housing, an impeller turning therewith, a rotary turbine wheel in said housing turning with the driven element, and a stationary reaction member in said housing, a ring gear turning with one of said driving and driven elements, planetary gears meshing therewith and carried on a frame turning with the other element, and a sun gear turning the aforesaid rotary housing, a coaxial hub turning with the sun gear, a coupling collar on said hub turning positively therewith, and one or more spring-restrained locking pawls slidable outwardly on said frame under centrifugal force and arranged to engage in slots provided therefor in said collar, whereby to positively lock the parts of said planetary mechanism to revolve as a unit, the outer ends of said pawls being formed on such inclination relative to the slotted portion of said collar so as to engage in the slots if the frame turns at the same speed or slightly faster than said collar, said pawls being arranged to be repelled when the collar turns faster than said frame.

6. In a planetary gearing mechanism, the combination with driving and driven elements, of a ring gear turning with one of said elements, planetary gears meshing therewith and carried on a frame turning with the other element, and a sun gear, a coaxial hub turning with the sun gear, a coupling collar on said hub turning positively therewith, and one or more spring-restrained locking pawls slidable outwardly on said frame under centrifugal force and arranged to engage in slots provided therefor in said collar, whereby to positively lock the parts of said planetary mechanism to revolve as a unit, the outer ends of said pawls being formed on such inclination relative to the slotted portion of said collar so as to engage in the slots if the frame turns at the same speed or slightly faster than said collar, said pawls being arranged to be repelled when the collar turns faster than said frame, said coupling collar being slidable on said hub toward and away from said frame, and said collar having a cam portion thereon arranged to engage a portion on each of said pawls to forcibly retract the same from locking position when said collar is moved in one direction on said hub.

7. In a transmission of the character described, the combination of driving and driven elements, a planetary type transmission mechanism comprising a ring gear turning with the driving element, planetary gears meshing therewith and carried on a frame turning with the driven element, and a sun gear independent of the driving and driven elements, a turbine ring type torque converter comprising rotatable pump impeller and turbine members and a cooperating stationary reaction member, the turbine member being arranged to be turned with the driven element, a coaxial hub turning with the sun gear and connected with the impeller element to turn the same, a coupling collar on said hub turning positively therewith, and one or more spring restrained locking pawls slidable outwardly on the aforesaid frame under centrifugal force and arranged to engage in slots provided therefor in said collar, whereby to positively lock the planetary gears and cause the ring gear to turn with the sun gear as a unit.

8. In a transmission of the character described, the combination of driving and driven elements, a planetary type transmission mechanism comprising a ring gear turning with the driving element, planetary gears meshing therewith and carried on a frame turning with the driven element, and a sun gear independent of the driving and driven elements, a turbine ring type torque converter comprising rotatable pump impeller and turbine members and a cooperating stationary reaction member, the turbine member being arranged to be turned with the driven element, a coaxial hub turning with the sun gear and connected with the impeller element to turn the same, a coupling collar on said hub turning positively therewith, and one or more spring restrained locking pawls slidable outwardly on the aforesaid frame under centrifugal force and arranged to engage in slots provided therefor in said collar, whereby to positively lock the planetary gears and cause the ring gear to turn with the sun gear as a unit, the outer ends of said pawls being formed on such inclination relative to the slotted portion of said collar so as to engage in the slots when the frame turns at the same speed or slightly faster than said collar, said pawls being arranged to be repelled when the collar turns faster than the frame.

9. A transmission as set forth in claim 8, wherein said coupling collar is slidable on said hub toward and away from said frame, and wherein said collar has a cam portion thereon arranged to engage a portion on each of said pawls to forcibly retract the same from locking position when said collar is moved in one direction on said hub.

10. In a mechanical-hydraulic transmission, the combination with driving and driven elements, of a torque converter comprising a rotary housing, an impeller turning therewith, a rotary turbine wheel in said housing turning with the driven element, and a stationary reaction member in said housing, a ring gear turning with one of said driving and driven elements, planetary gears carried on a frame turning with the other element, and a sun gear turning the aforesaid rotary housing, said planetary gears transmitting drive between the sun and ring gears, a coupling element turning with one of said sun and ring gears, and one or more spring restrained locking pawls slidable outwardly on said frame under centrifugal force and arranged to engage in slots provided therefor in said coupling element, whereby positively to lock the parts of the planetary mechanism to revolve as a unit, the outer ends of said pawls being formed on such inclination relative to the slotted portion of the coupling element so as to engage in the slots when the frame turns at the same speed or slightly faster than said coupling element, said pawls being adapted to be repelled when the coupling element turns faster than said frame.

11. In a transmission of the character described, the combination of driving and driven elements, a turbine ring type torque converter comprising rotatable pump impeller and turbine members and a cooperating stationary reaction member, the impeller member being connected to turn with the driving element and the turbine member being connected to turn with the driven element, a frame connected to turn with the driven element, a relatively rotatable coupling element adapted to turn with the driving element and having a portion extending around the periphery of said frame, and one or more spring restrained locking pawls slidable outwardly on said frame under centrifugal force and arranged to engage in slots provided therefor in said coupling element, whereby positively to lock the driving and driven elements to revolve together, the outer ends of said pawls being formed on such inclination relative to the slotted portion of said coupling element so as to engage in the slots when the frame turns at the same speed or slightly faster than the coupling element, said pawls being arranged to be repelled when the coupling element turns faster than said frame.

12. In a transmission of the character described, the combination of driving and driven elements, a turbine ring type torque converter comprising rotatable pump impeller and turbine members and a cooperating stationary reaction member, the impeller member being adapted to be connected to turn with the driving element and the turbine member being connected to turn with the driven element, a centrifugal clutch for automatically connecting the impeller member with the driving element when the latter attains a certain speed, a frame connected to turn with the driven element, a coupling element adapted to turn with the driving element and having a portion surrounding the periphery of said frame, and one or more spring restrained locking pawls slidable outwardly on said frame under centrifugal force and arranged to engage in slots provided therefor in said coupling element, whereby positively to lock the driving and driven elements to revolve together, the outer ends of said pawls being formed on such inclination relative to the slotted portion of said coupling element so as to engage in the slots when the frame turns at the same speed or slightly faster than the coupling element, said pawls being arranged to be repelled when the coupling element turns faster than said frame.

13. In a differential transmission, the combination of driving and driven elements, a sun gear and ring gear for a planetary type transmission mechanism, the ring gear being arranged to turn with the driving element and the sun gear being independent of the driving and driven elements, a turbine ring type torque converter comprising rotatable pump impeller and turbine members and a cooperating stationary reaction member, the turbine member being arranged to transmit torque to the driven element and the impeller member being adapted to be driven by the sun gear, drive gear means between the ring gear and impeller including planetary gears transmitting drive from the ring gear to the sun gear to cause the impeller to turn in the same direction with the ring gear, and a centrifugal clutch for automatically connecting the impeller with the driving element when the latter attains a certain speed.

14. In a differential transmission, the combination of driving and driven elements, a sun gear and ring gear for a planetary type transmission mechanism, the ring gear being arranged to turn with the driving element and the sun gear being independent of the driving and driven elements, a turbine ring type torque converter comprising rotatable pump impeller and turbine members and a cooperating stationary reaction member, the turbine member being arranged to transmit torque to the driven element and the impeller member being adapted to be driven by the sun gear, drive gear means between the ring gear and impeller including planetary gears transmitting drive from the ring gear to the sun gear to cause the impeller to turn in the same direction with the ring gear, and an overrunning clutch between the ring gear and the driving element arranged to engage automatically when the ring gear turns faster than the driving element.

15. In a differential transmission, the combination of driving and driven elements, a sun gear and ring gear for a planetary type transmission mechanism, the ring gear being arranged to turn with the driving element and the sun gear being independent of the driving and driven elements, a turbine ring type torque converter comprising rotatable pump impeller and turbine members and a cooperating stationary reaction member, the turbine member being arranged to transmit torque to the driven element and the impeller member being adapted to be driven by the sun gear, drive gear means between the ring gear and impeller including planetary gears transmitting drive from the ring gear to the sun gear to cause the impeller to turn in the same direction with the ring gear, a centrifugal clutch for automatically connecting the impeller with the driving element when the latter attains a certain speed, and an overrunning clutch between the ring gear and the driving element arranged to engage automatically when the ring gear turns faster than the driving element.

16. In a differential transmission, the combination of driving and driven elements, a planetary type transmission mechanism having a ring gear arranged to turn with the driving element, a sun gear, and planetary pinions connected to revolve with and transmit torque to the driven element and transmitting drive between the ring gear and sun gear, the sun gear being independent of the driving and driven elements, a centrifugal clutch for automatically connecting the impeller with the driving element when the latter attains a certain speed, and a turbine ring type torque converter comprising rotatable pump impeller and turbine members and a cooperating stationary reaction member, the turbine member being arranged to transmit torque to the driven element, and the impeller member being driven by the sun gear.

17. In a differential transmission, the combination of driving and driven elements, a planetary type transmission mechanism having a ring gear arranged to turn with the driving element, a sun gear, and planetary pinions connected to revolve with and transmit torque to the driven element and transmitting drive between the ring gear and sun gear, the sun gear being independent of the driving and driven elements, a centrifugal clutch for automatically connecting the impeller with the driving element when the latter attains a certain speed, an overrunning clutch between the ring gear and the driving element arranged to engage automatically when the ring gear turns faster than the driving element, and a turbine ring type torque converter comprising rotatable pump impeller and turbine members and a cooperating stationary reaction member, the turbine member being arranged to transmit torque to the driven element, and the impeller member being driven by the sun gear.

18. In a transmission, the combination of driving and driven elements, gearing for transmitting torque from said driving element to said driven element including a gear turnable independently of said driven element, a torque converter comprising a hollow rotary housing adapted to turn with said independent gear, an impeller member fixed in and turning with said housing, and a rotary turbine member and stationary reaction member in said housing in cooperating relation to said impeller, the turbine member arranged to transmit torque to the driven element, said housing and impeller together having sufficient mass to exert an inertia flywheel effect in the operation of said transmission, and an overrunning clutch between the gearing and the driving element adapted to engage when the gearing turns faster than the driving element.

19. In a transmission, the combination of driving and driven elements, gearing for transmitting torque from said driving element to said driven element including a gear turnable independently of said driven element, a torque converter comprising a hollow rotary housing adapted to turn with said independent gear, an impeller member fixed in and turning with said housing, and a rotary turbine member and stationary reaction member in said housing in cooperating relation to said impeller, the turbine member arranged to transmit torque to the driven element, said housing and impeller together having sufficient mass to exert an inertia flywheel effect in the operation of said transmission, an overrunning clutch between the gearing and the driving element adapted to engage when the gearing turns faster than the driving element, and manually controlled means for braking the rotation of said housing and impeller.

ADOLF G. SCHNEIDER.
HEINRICH SCHNEIDER.